Jan. 3, 1967 W. F. MIDDLESTADT 3,295,352
METHOD OF FORMING ARTICLES AND ARTICLE FORMING APPARATUS
Filed Sept. 11, 1963 3 Sheets-Sheet 1

INVENTOR.
WILLIAM F. MIDDLESTADT
BY *Stowell & Stowell*
ATTORNEY

Jan. 3, 1967 W. F. MIDDLESTADT 3,295,352
METHOD OF FORMING ARTICLES AND ARTICLE FORMING APPARATUS
Filed Sept. 11, 1963 3 Sheets-Sheet 2
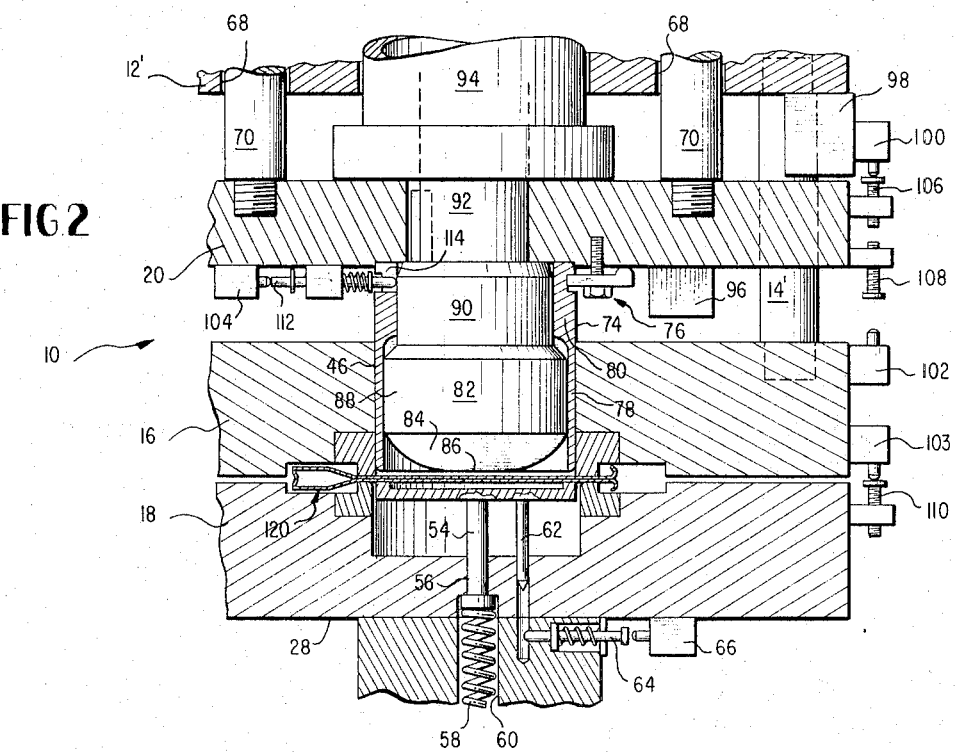
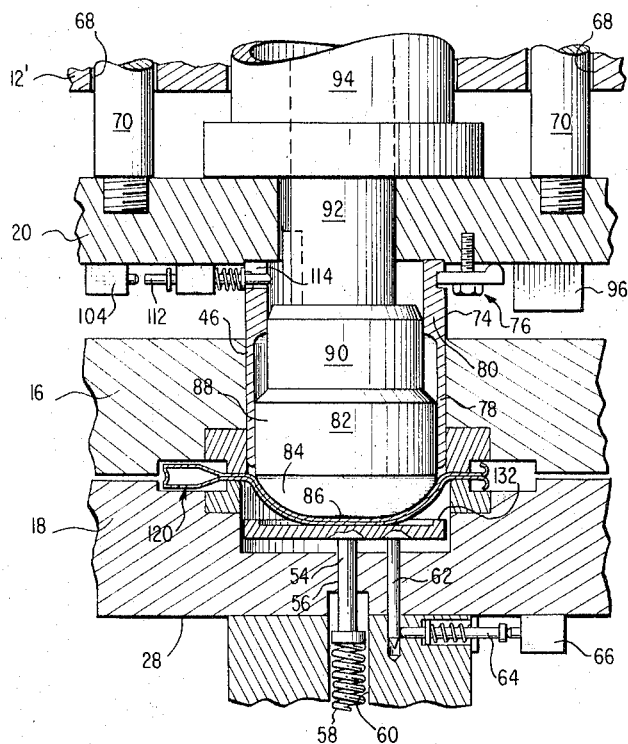
INVENTOR.
WILLIAM F. MIDDLESTADT
BY Stowell & Stowell
ATTORNEY Jan. 3, 1967  W. F. MIDDLESTADT  3,295,352
METHOD OF FORMING ARTICLES AND ARTICLE FORMING APPARATUS
Filed Sept. 11, 1963  3 Sheets-Sheet 3

INVENTOR.
WILLIAM F. MIDDLESTADT
BY
Stowell & Stowell
ATTORNEY

United States Patent Office 3,295,352
Patented Jan. 3, 1967

3,295,352
METHOD OF FORMING ARTICLES AND
ARTICLE FORMING APPARATUS
William F. Middlestadt, Arnold, Md.
(200 E. Joppa Road, Baltimore, Md. 21204)
Filed Sept. 11, 1963, Ser. No. 308,276
4 Claims. (Cl. 72—356)

This invention is directed to an improved method of forming articles and an improved article forming apparatus and, in particular, to a metal drawing process and apparatus for carrying out the process.

It is a principal object of the present invention to provide a method and apparatus for carrying out the method for forming in an extended surface planar member one or more depressions having side walls normal to the plane of the extended surface member and a bottom wall lying in a plane generally parallel to the plane of the member.

A further object is to provide a method and apparatus for carrying out the method whereby such depressions may be formed in a metal sheet stock without wrinkling, bowing or bending of the metal stock adjacent the periphery of the formed depression.

A further object is to provide such a method and apparatus wherein only rectilinear motion of a plurality of forming punches or slides are emplyed in forming the depressions in the rectilinear stock.

A further object of the present invention is to provide a method of forming articles pressed from a sheet wherein the side and bottom walls of the depression are substantially uniform in thickness.

These and other objects and advantages of the present invention are provided by a method of forming depressions in a planar extended surface sheet consisting of the steps of clamping a sheet entirely about a depression to be formed therein between a pair of plane clamping surfaces lying in a plane parallel to the plane of the sheet, press forming a flat bottom curved side wall depression in the sheet within the zone of the clamping surfaces with the space between the flat bottom surface and the clamping surface being substantially greater than the finished depth of the depression, progressively pressing the curved side wall of the depression into a plane normal to the plane of the clamping surface while causing the flat bottom surface to be urged toward the plane of the clamping surface; and by a sheet forming press comprising a pair of continuous opposed sheet metal clamping surfaces, means for directing a clamping force between said surfaces and normal to the plane of the sheet, a forming die member having a side wall normal to the clamping surface and substantially coextensive therewith; a pre-forming punch, said pre-forming punch having a cross dimension substantially less than the cross dimension of the forming die, a generally flat base and a convex side wall, means for urging said pre-forming punch into said forming die a distance greater than the finished depth of the depression to be formed in the sheet, means for maintining an elastic force substantially coextensive with the pre-forming die and in a direction opposite to the direction of movement of the pre-forming punch into the forming die, a final forming punch, said final forming punch being annular in cross-section and forming a sleeve about the pre-forming punch, the cross dimension of the outer surface of said final punch providing only a working tolerance in said forming die, and means for urging said final forming punch into said die following pre-forming by said pre-forming punch.

The invention will be more particularly described in reference to the accompanying drawings wherein:

FIG. 2 is a fragmentary vertical view in partial section of the apparatus illustrated in FIG. 1 with a sheet of material illustrated as being clamped between the clamping surfaces of the apparatus;

FIG. 3 is a view similar to that illustrated in FIG. 2 with the pre-forming punch in pre-forming position;

Figure 1:
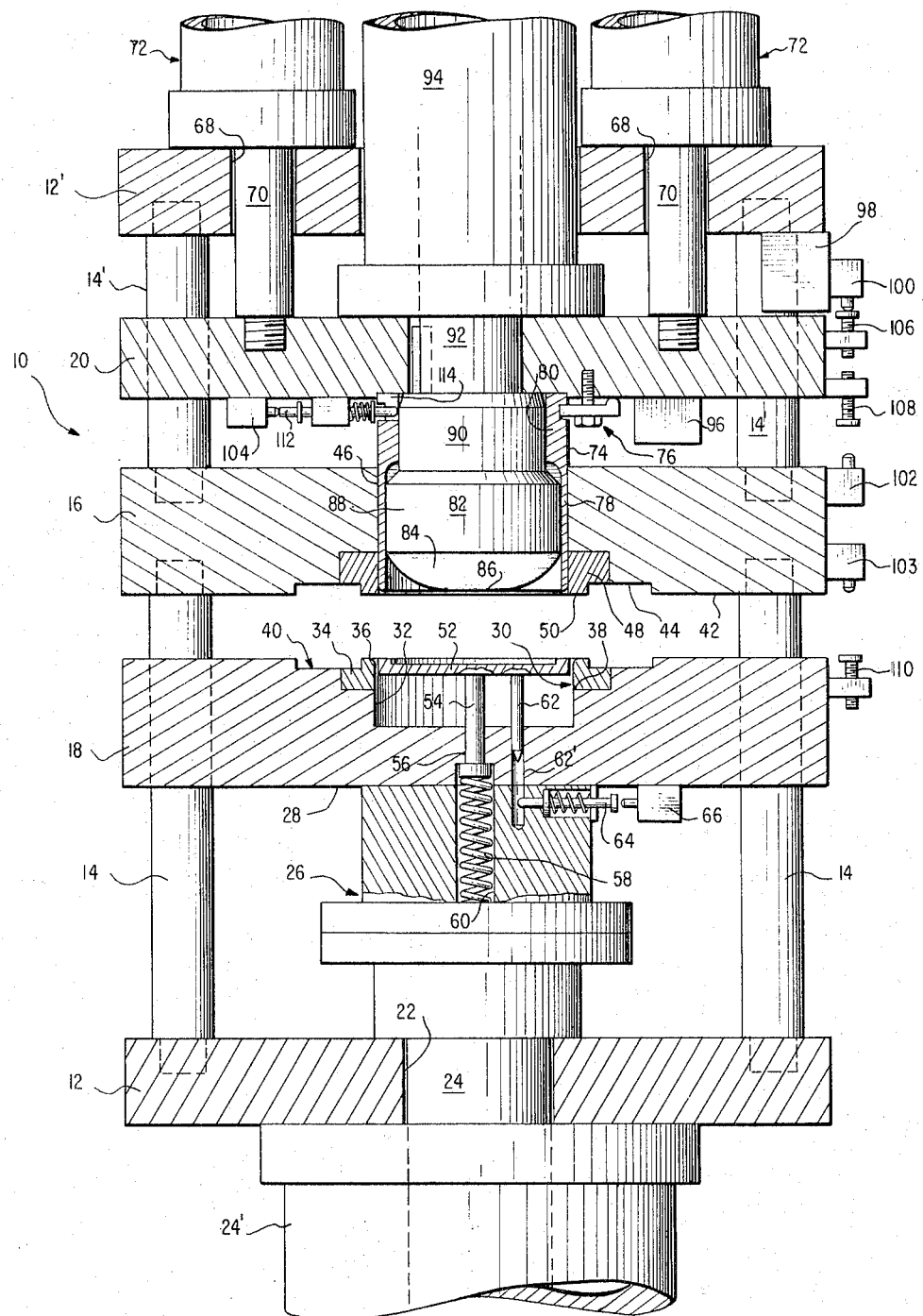
FIG. 1 is a fragmentary vertical view in partial section through a forming mechanism embodying the principles of the present invention illustrating the apparatus in fully open position ready to receive a sheet of material to be formed.
Figure 4:
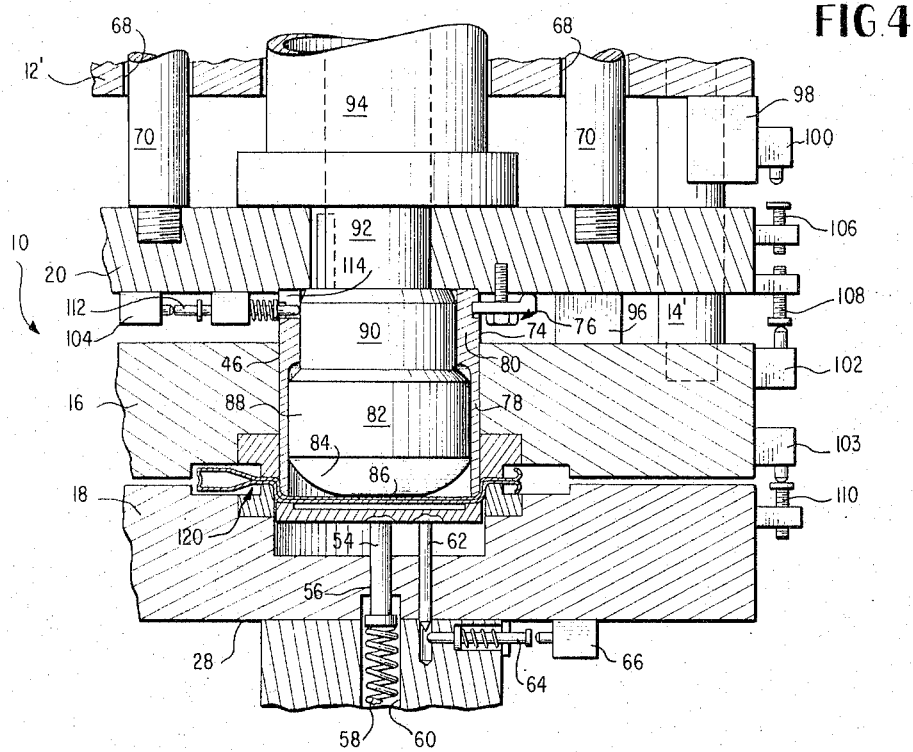
FIG. 4 is a view similar to that illustrated in FIGS. 2 and 3 with the final forming punch in the final forming position.

Referring to the drawings and, in particular, FIG. 1, 10 generally designates an improved forming press which generally includes a fixed base member 12 and a fixed top member 12′. The top member 12′ is mounted in spaced relationship to the base member by a plurality of generally vertically positioned rod members 14 and 14′.

The lower ends of rods 14 are secured in the base member 12 and the upper ends of rod members 14′ are secured in the top plate 12′. The upper ends of rods 14 and the lower ends of rods 14′ mount a fixed platen member 16 generally intermediate of the base member 12 and the top member 12′ and in parallel relationship thereto.

Slidably mounted on rods 14 is a movable platen 18 while slidably mounted on rods 14′ is a movable punch actuating plate member 20. The base member 12 has a bore 22 therein which slidably receives a piston rod 24 of a suitable hydraulic ram, the cylinder 24′ of which engages the lower surface of the plate member 12. The upper end of the piston rod 24 is connected to a spacer block means 26 and the block means has its upper end secured to the undersurface 28 of the movable platen 18. With this arrangement of piston rod, cylinder and spacer block directing pressure fluid to opposite ends of the cylinder 24′ causes the platen 18 to move toward and away from the fixed platen 16.

The upper surface of the movable platen 18 is provided with a bore 30 having side walls 32 which are normal to the plane of the top surface of the movable platen 18. The bore 30 comprises a portion of the forming die portion of the assembly. The upper portion of the die forming bore is recessed to receive a clamping ring 34 having a clamping surface 36. The inner wall of the annular clamping ring 34 is flush with the surface 32 of the die forming bore 30. Adjacent the outer surface of the clamping ring 34 are lateral channels generally designated 40 which channels receive marginal edge portions of the material to be formed as to be more fully described hereinafter.

The lower surface 42 of the fixed platen 16 is provided with cooperating grooves 44 in mating alignment with the channels 40 of the movable platen 18. The fixed platen 16 is bored as at 46 with the axis of the bore being vertically positioned above the axis of the bore 30 comprising the forming die. The lower surface of the bore 46 is channeled to receive a generally ring-shaped clamping member 48 having a clamping surface 50 which cooperates with the clamping surface 36 of the ring-shaped clamping member 34. It will be particularly noted that surface 50 of clamping member 48 has a greater width than clamping surface 36 of clamping member 34. Thus, the internal diameter of the ring-shaped clamping member 48 is less than the internal diameter of the die 30 and the internal diameter of the ring-shaped clamping member 34. These differences in diameter correspond generally to the thickness of the sheet material to be formed.

The forming die 30 slidably receives a control and ejecting pad member 52 having a cross dimension such that the pad member 52 is freely slidable within the bore of the die. The lower surface of the pad member 52 is secured to a rod 54 slidably received in a bore 56 in the movable platen 18. The rod 54 and, in turn, the pad member 52 are continuously urged toward the fixed platen 16 by resilient spring means 58 received in a bore 60 in a portion of the spacer block means 26. Further, the undersurface of the pad member 52 also has secured thereto a depending pin 62 which reciprocates in a bore 62' in the movable platen 18. The pin 62 is of a length such that the lower end of the pin engages a switch actuating pin 64 when the pad member 52 has been urged a predetermined distance downwardly within the die bore 30 as to be more fully described hereinafter.

The cooperation between pins 62 and 64 is such that a control switch 66 may be actuated when said predetermined inward movement of the pad member 52 has been accomplished.

The upper fixed plate member 12' is provided with at least a pair of bores 68 which slidably receive the extended ends of piston rods 70 having connection to pressure fluid rams generally designated 72. The extended ends of the ram piston rods 70 are secured to the movable punch actuating member 20, whereby directing pressure fluid to opposite ends of the pressure fluid ram 72 causes reciprocation of the plate member 20 relative to the fixed platen 16.

Slidably received in the bore 46 in the fixed platen 16 is a final forming punch 74 of generally annular shape in cross section. The upper end of the forming punch 74 is secured to the undersurface of the plate member 20 by one or more clamping means 76. The outer surface of the annular forming punch is in sliding engagement with the inner wall of the bore 46 and the inner surface of the annular forming punch is stepped to provide a relatively narrow portion 78 and a thicker portion 80.

Slidably received within the annular forming punch is a preforming punch 82. The pre-forming punch 82 has a lower dish-shaped portion 84 with the side walls curving smoothly inwardly to a flat base portion 86. Above the dish-shaped portion 84 is a cylindrical section 88 having an outside diameter which is snugly and slidably received in the maximum inner dimensioned portion 78 of the final forming punch member 74. The pre-forming punch member 82 is further provided with a reduced diameter neck portion 90 which is snugly and slidably received in the reduced diameter portion of the annular final forming punch member 74. The extended end of the pre-forming punch member 82 is connected to the end of a piston rod 92 of the high pressure fluid actuated ram 94. By directing pressure fluid to opposite ends of the pressure fluid ram 94, the pre-forming punch member 82 is reciprocated within the annular final forming punch 74.

The press assembly also includes a pair of stop blocks 96 and 98 and control switches 100, 102, 103 and 104. The control switches have adjustable actuator means 106, 108 and 110, for switches 100, 102 and 103, respectively, while switch 104 has a spring urged actuator 112. The extended end of actuator 112 operates through a slot 114 in the final forming annular punch 74 whereby the extended end is engageable by the outer surface of portion 90 of pre-forming punch member 82.

Figure 5:
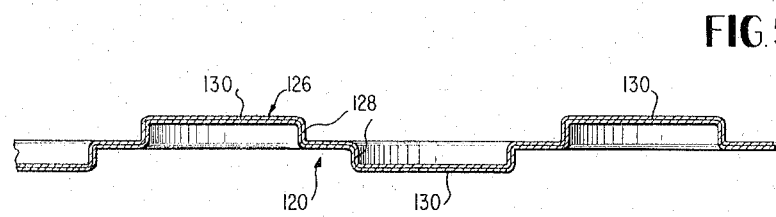
FIG. 5 is a sectional view through a sheet having a plurality of depressions formed therein by the apparatus illustrated in FIGS. 1 through 4 substantially on line 5—5 of FIG. 6.
Figure 6:
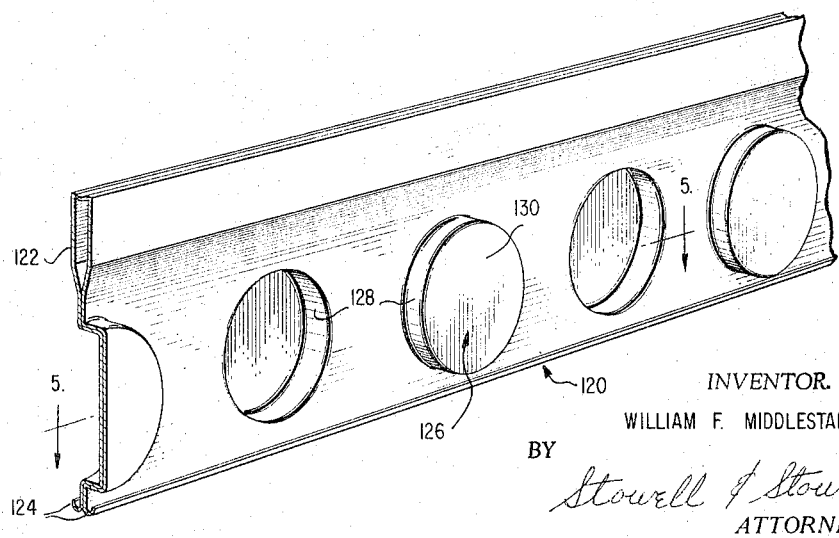
FIG. 6 is a perspective view of a formed sheet as illustrated in FIG. 5 of the drawings.

The press assembly illustrated in FIG. 1 is adapted to form an element 120 as illustrated in FIGS. 5 and 6. The element 120 consists of a metal sheet folded upon itself and provided with a spaced lateral edge 122, a recurved lateral edge portion 124 and a plurality of oppositely directed cup-shaped members 126 having straight side walls 128 and a flat bottom 130.

In the illustrated member 120 adjacent cup-shaped elements 126 project in opposite directions. Each of the cup-shaped members may be formed sequentially or a plurality of the elements 126 may be formed at the same time in an apparatus as illustrated in FIG. 1 having a plurality of the illustrated stations.

Operation of the apparatus of the invention, in carrying out the improved method, is illustrated in sequence in FIGS. 1, 2, 3 and 4. In FIG. 1, the movable platen 18 is in its spaced relationship to fixed platen 16 whereby the sheet stock may be inserted between the clamping surface 36 of clamping ring 34 and clamping surface 50 of clamping ring 48. With the sheet stock positioned between the clamping surfaces a master switch (not shown) is energized whereby pressure fluid is directed to the pressure fluid ram 24' in a direction to urge the ram piston rod 24 toward the fixed platen 16. This causes upward sliding movement of movable platen 18 clamping the plate member between the clamping jaws as illustrated in FIG. 2. It has been found that where the diameter of the depression to be formed in the sheet material is about 4½ inches outside diameter and the sheet material comprises a pair of 30-gauge steel plates that a clamping force in the order of 50 tons will adequately clamp the sheet stock between the faces of the clamping rings. When the clamping jaws are in register with the sheet stock, switch 103 is actuated by its adjustable actuating member 110.

Acutation of switch 103 causes the flow of pressure fluid to the upper end of pressure fluid ram 94, thus urging the ram piston 92 toward the fixed platen 16 which, in turn, forces the preforming punch 82 downwardly as illustrated in FIG. 3. The downward movement of the pre-forming punch pre-forms the metal stock into a generally bowl-shaped configuration, that is, the sheet metal stock is provided with annular concave walls and a flat bottom surface. As the sheet stock is pre-formed, the pad member 52 is urged downwardly against the tension in spring 60. When the pre-forming punch 82 has reached its desired downward motion, rod 62 cooperating with rod 64 actuates switch 66 causing the flow of pressure fluid to the opposite end of the piston of the pressure fluid ram 94 and the pre-forming punch returns to the position illustrated in FIG. 2.

It has been found that a rather gradual pressure rise applied to the pre-forming die from about 0 to a maximum equivalent to an applied force of about 15 tons will properly form the pair of 30-gauge steel sheets. It will be particularly noted that the force applied to the pre-forming die is substantially less than the clamping force maintaining the sheet members rigidly clamped between the clamping faces of the clamping rings. It has been found that if the maximum force applied to the pre-forming die is in the order of ⅓ the clamping force, there will be substantially no drawing of the sheet stock from between the jaws of the clamping rings.

When the pre-forming punch returns to its normal position as illustrated in FIG. 2, switch 104 is actuated through its actuating member 112. Actuation of switch 104 in the said sequence causes the flow of pressure fluid to the upper ends of the pair of pressure fluid rams 72 which, in turn, forces the piston rods 70 downwardly. The downward motion of the piston rods 70 causes the slide plate 20 to urge the final forming punch 74 to move into the position illustrated in FIG. 4. It will be particularly noted that the downward motion of the annular final forming punch urges the curved walls of the pre-formed depressed portion of the metal stock to move outwardly against the flat surfaces of the pre-forming die 30 and at the same time causes the flat bottom portion of the pre-formed depression to move upwardly. The upward movement of the flat base portion of the pre-formed depression is assisted by the upward movement of the control and ejecting pad member 52. As the side walls of the depression approach a position normal to the flat surfaces of the clamping ring, the upward pressure against the base of the pre-formed depression is transferred from the flat base portion to the periphery of the depression as more clearly illustrated in FIG. 4. Downward motion of the plate 20 also causes the inner or pre-forming punch member 82 to move downwardly since the bore in the plate member 20 adapted to receive the piston rod 92 is of a lesser dimension than the cross dimension of the portion 90 of the pre-forming die. This downward motion of the pre-forming punch at the time the final forming annular punch moves downwardly assists in maintaining the bottom of the depression flat and parallel to the plane of the sheet stock being maintained between the clamping jaws.

Switch 102 is actuated by its adjustable actuating member 108 at the limit of the downward motion of the final forming punch. Actuation of switch 102 causes the pressure fluid to flow in the opposite direction to rams 72 withdrawing the final forming punch 74. At the upward limit of travel of the plate member 20, switch 100 is actuated and at this portion of the cycle causes pressure fluid to flow in the opposite direction in hydraulic ram 24' whereby the clamping jaws are open to the position as illustrated in FIG. 1.

The force of spring 60 acting upon the control and ejecting pad member 52 lifts the formed sheet member from the die and means not shown in the drawing may be employed to reposition the sheet stock to position the sheet for the next depression forming cycle.

In general, the maximum force necessary to properly finally form the depression in two sheets of the 30-gauge steel is approximately 15 tons or about the same as employed in initially forming the bowl-shaped depression.

From the foregoing description of the present invention, it will be seen that an improved method of forming a depression in a planar extended surface metal sheet are provided, together with improvements in sheet metal forming apparatus.

It will be apparent to those skilled in the art that various modifications may be made in the form of the apparatus without departing from the scope of the present invention. For example, it is contemplated that both of the press platens 16 and 18 may be movable so that during the closing of the press, each of the platens move inwardly in equal amount. Where both of the platens 16 and 18 are movable, the apparatus would be more suitable for producing structures as shown in FIGS. 5 and 6 on a multiple unit press and advancement of the sheet structure would be facilitated where depressions are struck in opposite directions in the sheet.

Further, it will be appreciated that the pressure fluid actuated rams 24', 72 and 94 may be replaced with mechanical force applying means without sacrificing the advantages of the present invention.

What is claimed is:

1. A sheet forming press comprising a pair of continuous opposed sheet clamping surfaces, means for directing a clamping force between said surfaces and normal to the plane of the sheet to be formed, a forming die member having a side wall normal to the clamping surface and substantially coextensive therewith, a pre-forming punch, said pre-forming punch having a cross dimension substantially less than the cross dimension of the forming die, a generally flat base and a convex side wall, means for urging said pre-forming punch into said forming die a distance greater than the finished depth of the depression to be formed in the sheet, a final forming punch, said final forming punch forming a sleeve about the pre-forming punch, the cross dimension of the outer surface of said final punch providing only a working tolerance in said forming die, and means for urging said final forming punch into said die following pre-forming by said pre-forming die.

2. A sheet forming press comprising a pair of continuous opposed sheet clamping surfaces, means for directing a clamping force between said surfaces and normal to the plane of the sheet to be formed, a forming die member having a side wall normal to the clamping surface and substantially coextensive therewith, a pre-forming punch, said pre-forming punch having a cross dimension substantially less than the cross dimension of the forming die, a generally flat base and a convex side wall, means for urging said pre-forming punch into said forming die a distance greater than the finished depth of the depression to be formed in the sheet, means for maintaining an elastic force substantially coextensive with the pre-forming die and in a direction opposite to the direction of movement of the pre-forming punch into the forming die, a final forming punch, said final forming punch forming a sleeve about the pre-forming punch, the cross dimension of the outer surface of said final punch providing only a working tolerance in said forming die, and means for urging said final forming punch into said die following pre-forming by said pre-forming die.

3. A sheet metal forming press comprising a pair of annular opposed sheet metal clamping surfaces, means for directing a clamping force to said surfaces and normal to the plane of the sheet to be formed, a forming die member having a cylindrical side wall normal to the clamping surface and substantially coextensive therewith, a pre-forming punch, said pre-forming punch having a diameter substantially less than the diameter of the forming die, a generally flat face and a convex side wall, means for urging said pre-forming punch into said forming die a distance greater than the finished distance of the depression to be formed in the sheet, means for maintaining an elastic force substantially coextensive with the pre-forming die and in a direction opposite to the direction of movement of the pre-forming punch in the forming die, a final forming punch, said final forming punch being annular in cross section and forming a sleeve about the pre-forming punch, the diameter of the outer surface of said final forming punch providing only a working clearance in said forming die, and means for urging said final forming punch into said die following pre-forming by said pre-forming die.

4. A method of forming depressions in a planar extended surface sheet consisting of the steps of clamping a sheet entirely about a depression to be formed therein between a pair of plane clamping surfaces lying in a plane parallel to the plane of sheet, press forming a flat bottom, curved side wall dish-shaped depression in the sheet within the zone of the clamping surfaces with the spacing between the flat bottom surface and the clamping surfaces being substantially greater than the finished depth of the depression, while providing an elastic base support for the flat bottom of the depression, progressively pressing the curved side walls of the depression in a plane normal to the plane of the clamping surface while causing the flat bottom surface to be urged toward the plane of the clamping surface.

References Cited by the Examiner

UNITED STATES PATENTS

| | | | |
|---|---|---|---|
| 1,858,047 | 5/1932 | Ireland | 72—354 |
| 2,305,866 | 12/1942 | Graf | 72—120 |
| 2,959,110 | 11/1960 | Thoma | 72—348 |
| 3,194,047 | 7/1965 | Eggert et al. | 72—349 |

CHARLES W. LANHAM, *Primary Examiner.*

RICHARD J. HERBST, *Examiner.*